Dec. 11, 1923.
O. W. HANSON
PISTON PACKING RING
Original Filed Oct. 27, 1920
1,477,120
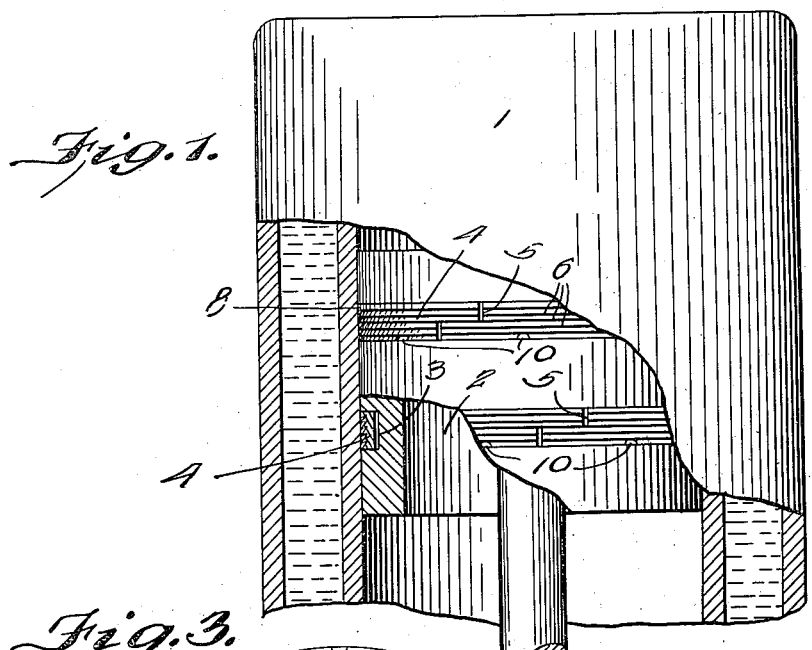
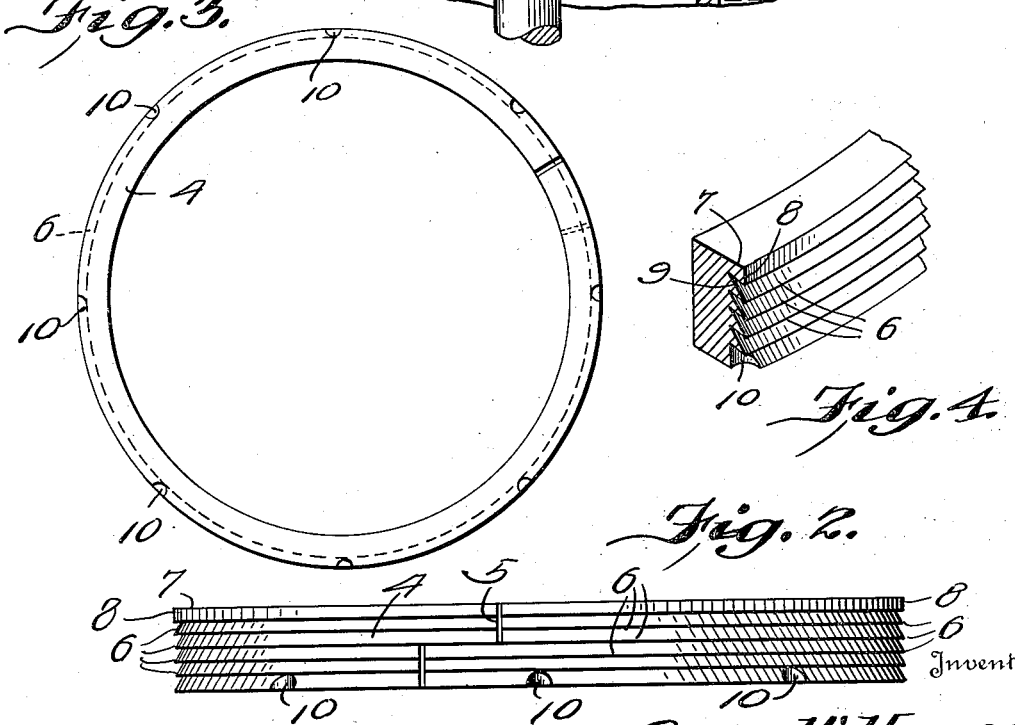
Inventor:
Oscar W. Hanson,
Witness Patented Dec. 11, 1923.

1,477,120

UNITED STATES PATENT OFFICE.

OSCAR W. HANSON, OF SALINA, KANSAS.

PISTON PACKING RING.

Application filed October 27, 1920, Serial No. 419,903. Renewed May 2, 1923.

*To all whom it may concern:*

Be it known that I, OSCAR W. HANSON, a citizen of the United States, residing at Salina, in the county of Saline and State of Kansas, have invented new and useful Improvements in Piston Packing Rings, of which the following is a specification.

My invention relates to packing rings for engine pistons, and more particularly to a type of the same adapted for use in connection with pistons of internal combustion engines.

The primary object of the invention is to provide a comparatively simple split packing ring construction, which will function effectually as a packing between the piston and the opposed wall of an engine cylinder, and, at the same time, will operate against the latter to effectively clear the same of surplus oil films, whereby to prevent such films of oil from creeping past the piston and becoming carbonized in the upper part of the cylinder, such as now commonly occurs in the use of known constructions of similar character, and which results in decreased efficiency in the operation of the engine, undue wear and "pitting" of the cylinder wall and surfaces of the piston, and diminished effectiveness of the ignition spark of the plugs.

A further object of the invention is to provide a ring with wear surfaces which will adjust themselves to the wear of the cylinder walls and thus cause the ring to conform closely to the irregular shape of a worn cylinder and prevent leakage even when the cylinder is to a considerable extent out of "true".

With the foregoing and other objects in view, the invention resides in the certain features of construction and arrangement of parts as will be hereinafter more specifically described, set forth in the appended claims, and illustrated in the accompanying drawing, in which:—

Figure 1 is a fragmentary detail of an engine cylinder and the piston thereof with the invention applied to the latter, Figure 2 is an edge view of the packing ring, Figure 3 is a plan view of the lower face of the same, and Figure 4 is an enlarged detail, in cross section, of a segmental portion thereof.

In Figure 1. of the drawing, I have shown the invention as applied for use in conjunction with the cylinder and piston construction of the ordinary type of internal combustion engine, but it is contemplated that the same may be used in connection with any other type of apparatus or mechanism involving a sliding piston, or pistons, requiring the use of packing rings, and therein, the cylinder is indicated by the numeral 1 and the piston at 2, the latter having one or more circumferential annular grooves 3, each adapted to snugly seat therein a packing ring 4.

The packing ring 4 consists of a circular band or bar of suitable spring metal, such as special high-grade close-grained cast-iron, or other metal having similar characteristics, substantially square or rectangular in cross-section, and split in any desired or ordinary manner as shown at 5. The outer periphery of the ring 4 is formed to provide a plurality of circumferential, substantially knife-edged ridges or corrugations 6, and a single ridge or corrugation 7 extending radially from the top edge of the outer periphery and having a peripheral face 8 of relatively wide area as distinguished from the knife-like edges of the ridges or corrugations 6. The lower faces of the ridges or corrugations 6 and 7 are undercut, as indicated at 9, Figure 4. so that the edges thereof are disposed in a downwardly inclined angular relation with respect to the cylinder wall, when the ring, or rings 4 are in operative position, and which, consequently, results in a shear-like, or scraping action in the downward movement of the piston and a free sliding, or non-scraping action in the upward movement of the same. This shear-like or scraping action is designed to keep the wall of the cylinder free of practically all deposits of oil splashing therein from the crank-case and thereby prevent the formation of the usual carbon deposits within the explosive end of the cylinder, or chamber, thus obtaining maximum efficiency throughout the life of new engines equipped with the device, and, to increase the efficiency of old or used engines by clearing the coated wall of the cylinders thereof. when the same is substituted for the ordinary types of packing rings.

To facilitate the downward flow and return of the surplus oil to the crank-case, during the scraping action of the ring or rings 4 on the downward stroke of the piston, the peripheral face of the lower edge of the ring 4 is provided with a series of equi-distantly spaced recesses 10, the same extending through the lower of the ridges or corrugations 6 and communicating with the groove formed between the latter and the next higher of said edges or corrugations, which arrangement prevents the backing up of the oil within the grooves, and, consequently prevents the oil being carried upward of the cylinder.

It is to be noted that the upper ridge or corrugation 7, by having a relatively wide periphery as compared to the knife-like edges of the ridges or corrugations 6, provides for a bearing surface such as tends to prevent otherwise rapid wearing down of the edges of the latter and to distribute the wear evenly to all of the ridges or corrugations. However, as it is obvious that the greatest wear will be sustained by the lower of the ridges or corrugations 6 by reason of its performing the initial scraping action and by the others, with diminishing effect, in upward succession, it is also to be noted of the upper ridge or corrugation 7, with its bearing periphery or surface 9, that it will be the last one to be effected, and, consequently, will, throughout practically the entire life of the ring, act to prevent the passage of a sufficient quantity of oil to defeat the objects as stated for the invention.

It is to be further noted that, in the manufacture of the invention, the rings may be of any desired width, and that the number of ridges or corrugations may be varied accordingly. In the usual type of ring for use on pistons of internal combustion engines, the same being generally one-quarter of an inch in width, it is contemplated to form five of the ridges or corrugations thereon, the lower four of which will be of the knife-edge construction, as shown in the several views of the drawings.

An important feature of my invention, additional to those above-described, resides in the fact that the sharp edges of the ridges or corrugations will wear away rapidly where they first come into contact with the cylinder walls, and therefore soon adjust the ring to the surfaces of a worn cylinder, thus securing a quick seal and preventing leakage even when the cylinder is considerably worn or out of "true", due to piston slap and other causes.

Having thus fully described my invention, I claim:—

1. A piston packing ring comprising a split resilient band provided with a series of spaced annular corrugations upon its periphery between its top and bottom faces, the uppermost one of said corrugations being undercut on its lower face only to form a lower cutting edge and having a broad flat circumferential surface to bear upon the cylinder wall, and each of the other of said corrugations having an upper surface inclining outwardly and downwardly at a comparatively sharp angle and a lower undercut surface inclining outwardly and downwardly at a relatively gentler angle, said upper and lower inclined surfaces converging to a point so as to form a downwardly and outwardly inclined, wedge-shaped corrugation terminating in a sharp cutting edge, the cutting edges of all the corrugations being arranged for a cutting or scraping action on the cylinder wall in one direction of movement only of the piston.

2. A piston packing ring comprising a split resilient band provided with a series of spaced annular corrugations upon its periphery between its top and bottom faces, the uppermost one of said corrugations being undercut on its lower face only to form a lower cutting edge and having a broad flat circumferential surface to bear upon the cylinder wall, and each of the other of said corrugations having an upper surface inclining outwardly and downwardly at a comparatively sharp angle and a lower undercut surface inclining outwardly and downwardly at a relatively gentler angle, said upper and lower inclined surfaces converging to a point so as to form a downwardly and outwardly inclined, wedge-shaped corrugation terminating in a sharp cutting edge, the cutting edges of all the corrugations being arranged for a cutting or scraping action on the cylinder wall in one direction of movement only of the piston, and an annular series of notches opening through the bottom corrugation solely and connecting the bottom face of the ring exclusively with the space or groove above the lowermost corrugation and between the same and the next adjacent superposed corrugation.

In testimony whereof I affix my signature.

OSCAR W. HANSON.